(12) United States Patent
Accapadi et al.

(10) Patent No.: US 9,928,157 B2
(45) Date of Patent: Mar. 27, 2018

(54) FILTERING MULTIPLE IN-MEMORY TRACE BUFFERS FOR EVENT RANGES BEFORE DUMPING FROM MEMORY

(71) Applicant: International Business Machines Corporation, Armonk, NY (US)

(72) Inventors: Mathew Accapadi, Cedar Park, TX (US); Grover C. Davidson, II, Round Rock, TX (US); Dirk Michel, Austin, TX (US); Bret R. Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 14/552,942

(22) Filed: Nov. 25, 2014

(65) Prior Publication Data

US 2016/0147653 A1 May 26, 2016

(51) Int. Cl.
*G06F 11/36* (2006.01)
(52) U.S. Cl.
CPC ............................ *G06F 11/3636* (2013.01)
(58) Field of Classification Search
CPC ....................................................... G06F 12/06
USPC ......................................................... 711/154
See application file for complete search history.

(56) References Cited

U.S. PATENT DOCUMENTS

| 8,219,979 | B2 | 7/2012 | Yang |
| 8,959,442 | B2 | 2/2015 | Chilimbi et al. |
| 9,021,311 | B2 | 4/2015 | Miller |
| 2004/0025144 | A1* | 2/2004 | Yang ................... G06F 11/3612 717/128 |
| 2011/0138363 | A1 | 6/2011 | Schmelter et al. |
| 2014/0301213 | A1* | 10/2014 | Khanal ................... H04L 43/12 370/248 |

FOREIGN PATENT DOCUMENTS

JP        2008299360        12/2008

OTHER PUBLICATIONS

Desnoyers et al, "Highly-Scalable Wait-Free Buffering Scheme for Multi-Core System Tracing", http://www.dorsal.polymtl.ca/sites/www.dorsal.polymtl.ca/files/publications/desnoyers-mcc09-final.pdf.

* cited by examiner

*Primary Examiner* — Adam M Queler
*Assistant Examiner* — Edmund Kwong
(74) *Attorney, Agent, or Firm* — Scully, Scott, Murphy & Presser, P.C.

(57) ABSTRACT

A method for filtering multiple in-memory trace buffers for event ranges is provided. The method includes allocating a plurality of main trace buffers, based on the number of central processing units (CPU) participating in a trace. Each CPU has a dedicated main trace buffer, and each main trace buffer is circular. Each main trace buffer is divided into an equal number of sub-buffers. A plurality of events is written to the current sub-buffer. When the current sub-buffer is filled, events are written to the next sub-buffer. Events are extracted from at least one of the sub-buffers, starting with the sub-buffer that includes a compare time and ending at the end of the main trace buffer.

17 Claims, 6 Drawing Sheets

| 305 | 310 | 315 | 320 | 325 | 330 |
|---|---|---|---|---|---|
| | 1 | Begin timestamp | End timestamp | 0xA00000 | 0x13FFFF0 |
| | 2 | Begin timestamp | End timestamp | 0x1400000 | 0x1DFFFF0 |
| | 3 | Begin timestamp | End timestamp | 0x1E00000 | 0x27FFFF0 |
| | 4 | Begin timestamp | End timestamp | 0x2800000 | 0x31FFFF0 |
| | 5 | Begin timestamp | End timestamp | 0x3200000 | 0x3BFFFF0 |
| | 6 | Begin timestamp | End timestamp | 0x3C00000 | 0x45FFFF0 |

FIGURE 3

FILTERING MULTIPLE IN-MEMORY TRACE BUFFERS FOR EVENT RANGES BEFORE DUMPING FROM MEMORY

BACKGROUND

This disclosure relates generally to computer systems, and more particularly to filtering multiple in-memory trace buffers for event ranges before dumping from memory.

An in-memory trace is a common technique for collecting time-based events. The trace collects a configurable set of events in a time ordered way. On large systems, the use of a single trace buffer to collect trace events becomes a scalability performance bottleneck. Therefore, alternative implementations allow trace events to be collected on a per-CPU basis, with separate buffers containing the events for each CPU. Timestamps may be used in post-processing to create a fully time ordered trace to the extent that the timestamps are granular. Collecting traces may involve complex combinations of events that may occur over a long period of time, resulting in large amounts of data. Similarly, a large amount of trace data may be collection when the desired event occurs infrequently. Additionally, the rate of events collected over time may vary considerably since the computer operating system may dispatch work to some CPUs but not to others, especially when there is not enough activity on the computer system to utilize more than a few of the CPUs.

A significant improvement in the usability of the trace may be achieved if the extraction of the trace from memory could exclude the potentially vast set of events which are beyond some configurable age.

SUMMARY

According to one embodiment, a method for filtering multiple in-memory trace buffers for event ranges is provided. The method includes allocating a plurality of main trace buffers, based on a number of central processing units (CPU) participating in a trace. Each CPU has a dedicated main trace buffer, and each main trace buffer is circular. Each of the plurality of main trace buffers is divided into an equal number of sub-buffers. The plurality of events is written to the current sub-buffer. A compare time is determined from input to the command to stop the trace. Events are extracted from at least one sub-buffer, starting with the sub-buffer that includes the determined compare time and ending at the end of the main trace buffer.

According to another embodiment, a computer program product for filtering multiple in-memory trace buffers for event ranges is provided. The computer program product includes a computer readable storage medium readable by a processing circuit and storing instructions for execution by the processing circuit for performing a method is provided. The method includes allocating a plurality of main trace buffers, based on a number of central processing units (CPU) participating in a trace. Each CPU has a dedicated main trace buffer, and each main trace buffer is circular. Each of the plurality of main trace buffers is divided into an equal number of sub-buffers. The plurality of events is written to the current sub-buffer. A compare time is determined from input to the command to stop the trace. Events are extracted from at least one sub-buffer, starting with the sub-buffer that includes the determined compare time and ending at the end of the main trace buffer.

According to another embodiment, a computer system for filtering multiple in-memory trace buffers for event ranges is provided. The computer system includes a memory, a processing unit communicatively coupled to the memory, and a management module communicatively coupled to the memory and processing unit, whereby the management module is configured to perform the steps of a method is provided. The method includes allocating a plurality of main trace buffers, based on a number of central processing units (CPU) participating in a trace. Each CPU has a dedicated main trace buffer, and each main trace buffer is circular. Each of the plurality of main trace buffers is divided into an equal number of sub-buffers. The plurality of events is written to the current sub-buffer. A compare time is determined from input to the command to stop the trace. Events are extracted from at least one sub-buffer, starting with the sub-buffer that includes the determined compare time and ending at the end of the main trace buffer.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

FIG. 3 illustrates a table over time for a CPU trace.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure relates generally to the field of computer systems, and more particularly to filtering multiple trace buffers for event ranges before dumping from memory. A system trace may be configured to collect a configurable set of events in a time ordered way. Traces may be collected on a per-CPU basis, with separate buffers containing the events for each CPU. Timestamps may be used in post-processing to create a fully time ordered trace to the extent that the timestamps are granular.

The following described exemplary embodiments provide a system, method and program product for filtering multiple in-memory trace buffers for event ranges before dumping from memory. The technical effects and benefits include the ability to reduce the time to isolate and diagnose an event that may be impacting the business enterprise, and the conservation of memory and computer system resources by reducing the quantity of trace output while improving its quality and accuracy.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Figure 1:
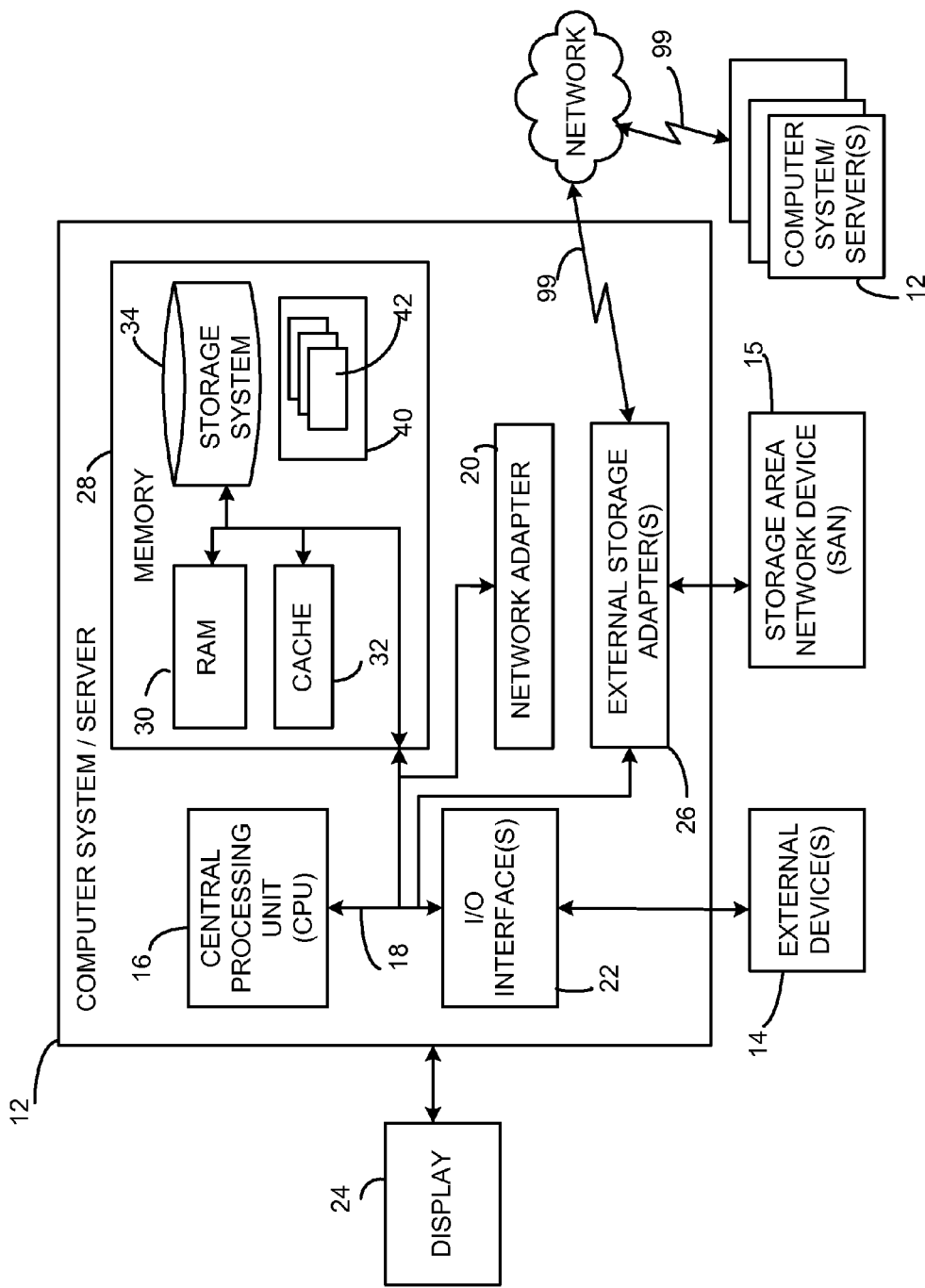
FIG. 1 illustrates an exemplary computing node operable for various embodiments of the disclosure.

Turning now to FIG. 1, a block diagram of an exemplary computer system (server) 12 operable for various embodiments of the disclosure is presented. As shown, the server 12 is only one example of a suitable computer for executing the program instructions for filtering multiple in-memory trace buffers for event ranges before dumping from memory, and is not intended to suggest any limitation as to the scope of use or functionality of embodiments of the disclosure described herein.

The server 12 is operational in numerous other computing system environments or configurations. For example, the server 12 may be a standalone machine, a virtual partition on physical host, a clustered server environment, or a distributed cloud computing environment that include any of the above systems or devices, and the like. When practiced in a distributed cloud computing environment, tasks may be performed by both local and remote servers 12 that are linked together and communicate through a communications network, such as the network 99.

The server 12 may be described in the context of executable instructions, such as a program, or more specifically, an operating system (OS) 40 that is an aggregate of program modules 42 being executed by the processing unit (CPU) 16 to control the operation of the server 12. Program modules 42 perform particular tasks of the OS 40, such as process management; memory management; and device management. Certain program modules 42 of the OS 40 may be referred to as the kernel. The kernel provides the essential services of the OS 40 and manages the interaction between the OS 40 and the hardware components of the server 12. The program modules 42 may be implemented as routines, programs, objects, components, logic, or data structures, for example. The program modules 42 performing the particular tasks may be grouped by function, according to the server 12 component that the program modules 42 control. At least a portion of the program modules 42 may be specialized to execute the algorithms of FIGS. 4-5.

In a distributed computing environment, such as a cloud computing environment, each participating server 12 may be under the control of an OS 40 residing on each local and remote server 12, respectively. In a virtual machine, also referred to as a virtual server, each instance of the virtual machine is an emulation of a physical computer. A physical computer may host multiple virtual machine instances, each sharing the hardware resources of the physical computer, and each emulating a physical computer. Each of the virtual machine instances is under the control of an OS 40.

As shown in FIG. 1, the components of the server 12 may include, but are not limited to, one or more processors or processing units (CPU) 16, a system memory 28, and a bus 18 that couples various system components, such as the system memory 28, to processor 16.

System memory 28 can include computer system readable media in the form of volatile memory, such as random access memory (RAM) 30 and/or cache memory 32. A portion of system memory 28 is allocated for the kernel to create control structures, such as page tables and the in-memory trace buffers. The server 12 may further include other removable/non-removable, volatile/non-volatile computer system storage media.

By way of example only, a storage system 34 can be provided as one or more devices for reading from and writing to a non-removable, non-volatile magnetic media, such as a hard disk drive (HDD) or an optical disk drive such as a CD-ROM, DVD-ROM. Each device of the storage system 34 can be connected to bus 18 by one or more data media interfaces. The program modules 42, the OS 40, and one or more application programs may be stored on the storage system 34 and subsequently loaded into memory 28 for execution, as needed.

The server 12 may also communicate with one or more external devices 14 such as a keyboard, a pointing device, a display 24, etc.; one or more devices that enable a user to interact with the server 12; and/or any devices (e.g., network card, modem, etc.) that enable the server 12 to communicate with one or more other computing devices. Such communication can occur via I/O interfaces 22. Still, the server 12 can communicate with one or more networks such as a local area network (LAN), a general wide area network (WAN), and/or a public network (e.g., the Internet) via a network adapter 20. As depicted, the network adapter 20 communicates with the other components of the server 12 via bus 18. External storage adapter 26 connects the server 12 with external storage subsystems, such as a storage area network (SAN) 15 or RAID array. The in-memory trace buffers may be flushed to an external storage subsystem or to the storage system 34 upon completion of the trace. Exemplary external storage adapters 26 include, but are not limited to, a host bus adapter (HBA), host channel adapter (HCA), SCSI, and iSCSI, depending upon the architectural implementation. The external storage adapter 26 communicates with the processing unit 16 and memory 28 of the server 12 over bus 18.

It should be understood that although not shown, other hardware and/or software components could be used in conjunction with the server 12. Examples include, but are not limited to: microcode, device drivers, redundant processing units, external disk drive arrays, RAID systems, tape drives, and data archival storage systems, etc.

Figure 2:
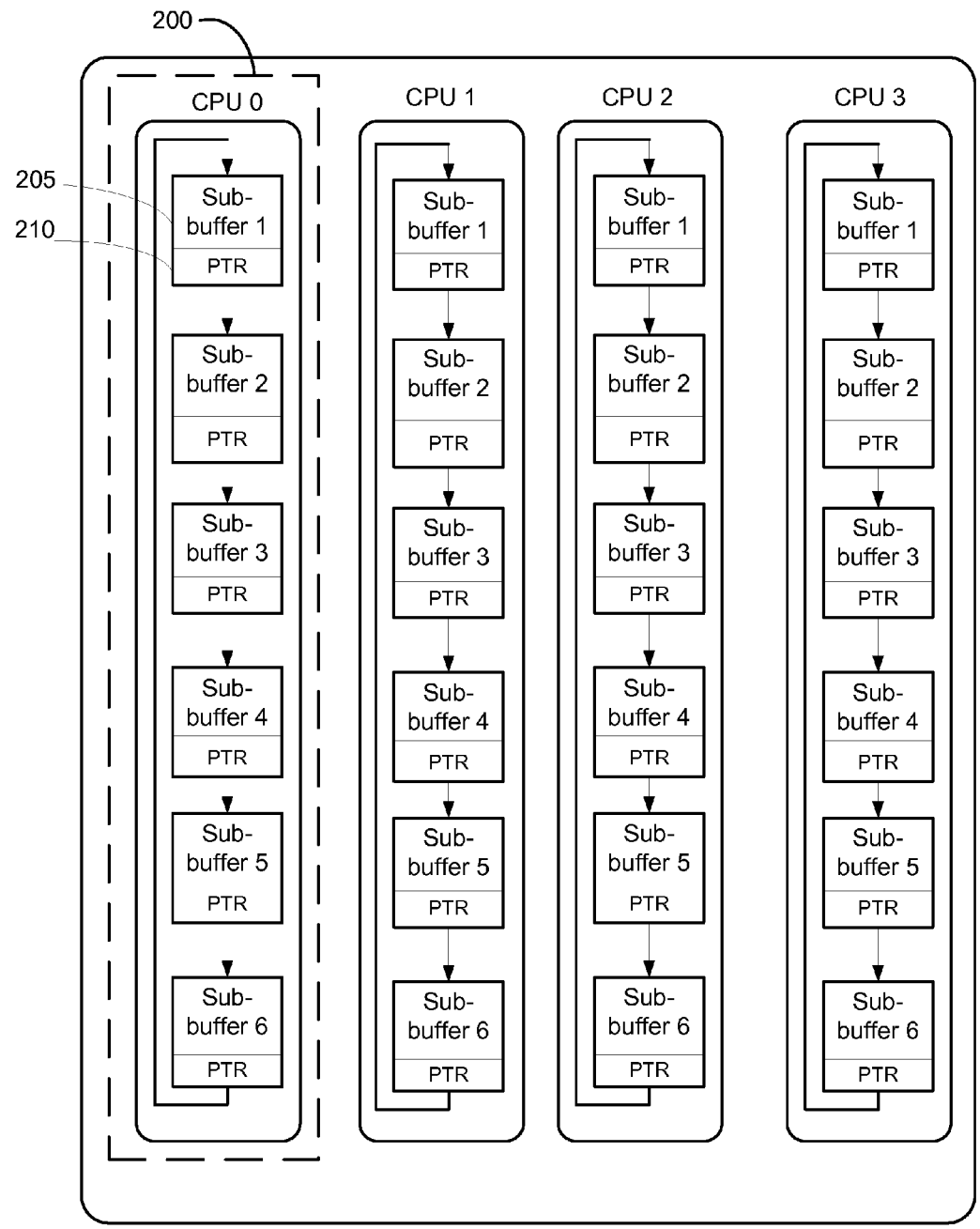
FIG. 2 illustrates per-CPU in-memory trace buffers.

Referring now to FIG. 2, per-CPU in-memory trace buffers are illustrated. A server 12 (FIG. 1) may include "1024" CPUs, but as an example only four are shown herein. The system trace is an OS 40 (FIG. 1) component that may be invoked to record events, including: calls from an application program for system services, i.e., system calls; entry and exit to kernel routines; selected processes; and interrupt handlers. When the trace is initiated, the trace events are collected in dedicated in-memory buffers. Upon termination of the trace, the selected events in the trace buffers are flushed to storage media, such as system storage 34 or SAN 15 (both of FIG. 1).

Several alternatives for collecting trace data may be practiced, including: collecting all CPUs 16 on the server 12 (both of FIG. 1) into a single trace buffer; and allocating a separate trace buffer for each CPU 16 (FIG. 1). However, these alternatives may have undesirable performance and efficiency side effects, such as being a bottleneck as each CPU 16 (FIG. 1) attempts to access the buffer, or by impeding analysis because of the large amounts of data that is produced.

In FIG. 2 each CPU 16 (FIG. 1) has a dedicated trace buffer 200 of a user-configurable size. Four trace buffers 200 are shown, each corresponding to one of the four CPUs 16 in the server 12 (both of FIG. 1). Each trace buffer 200 may be user-configurable into several equally sized sub-buffers 205. For example, each of the trace buffers, such as trace buffer 200, may be configured as "60" megabytes (MB), with "6" sub-buffers 205 of "10" MB each. The trace buffers 200 may be allocated from volatile memory, such as RAM 30 and/or cache memory 32 (both of FIG. 1), and may be pinned in memory. Memory that may not be paged out to external storage may be referred to as pinned memory. Each of the sub-buffers 205 may include a pointer, ptr 210, whereby a next sub-buffer 205 may be located when a current sub-buffer 205 is filled with trace data. When the last sub-buffer 205 in the trace buffer 200 is filled, its pointer ptr 210 locates the first sub-buffer 205 in the trace buffer 200, where the trace component may continue writing trace events in a circular manner. In this way, each trace buffer 200 may be filled with trace events according to the rate of activity dispatched to that CPU 16 (FIG. 1), and each trace buffer 200 may include trace events only from the same CPU 16 (FIG. 1). While the sub-buffers 205 may be contiguous in memory, the pointers ptr 210 allow for non-contiguous sub-buffers 205 as well.

Referring now to FIG. 3, a table over time for a CPU 16 (FIG. 1) trace is illustrated. Each CPU 16 (FIG. 1) trace buffer 200 (FIG. 2) has a corresponding table 300. Each entry 305 includes an index 310 into the table 300. Each index 310 corresponds to a sub-buffer 205 number in the trace buffer 200 (both of FIG. 2). When the OS 40 (FIG. 1) writes the first trace entry into a sub-buffer 200 (FIG. 2), the OS 40 (FIG. 1) also records in the table 300 the begin timestamp 315 of the first event in the sub-buffer 205 (FIG. 2), and a begin address 325 of the location where the sub-buffer 205 (FIG. 2) starts in memory. When the sub-buffer 205 (FIG. 2) is filled, the OS 40 (FIG. 1) records the end timestamp 320 of the last event written to the sub-buffer 205 (FIG. 2) and an end address 330 where the sub-buffer 205 (FIG. 2) ends in memory. As a result, the range of time associated with events in a sub-buffer 205 (FIG. 2) and the location of the sub-buffer 205 (FIG. 2) in memory are known.

In the example shown in entry 305, index 310 having a value of "1" corresponds to the first sub-buffer 205 in trace buffer 200 (both of FIG. 2) for CPU 0. The begin address 325 indicates the location where the first sub-buffer 205 (FIG. 2) begins in memory. Both the begin timestamp 315 and the end timestamp 320 may be expressed as a well-known computing standard referred to as the EPOCH, which is a count of the number of seconds since Jan. 1, 1970. An OS 40 (FIG. 1) provides well-known library routines to convert the elapsed seconds since the EPOCH to current date and time for displaying to end-users, for example. The begin address 325 of "0xA0000" is a hexadecimal representation of the memory location where the first sub-buffer 205 (FIG. 2) for CPU 0 begins. The end address of "0x13FFFF0" indicates the location where the first sub-buffer 205 (FIG. 2) ends in memory.

Figure 4:
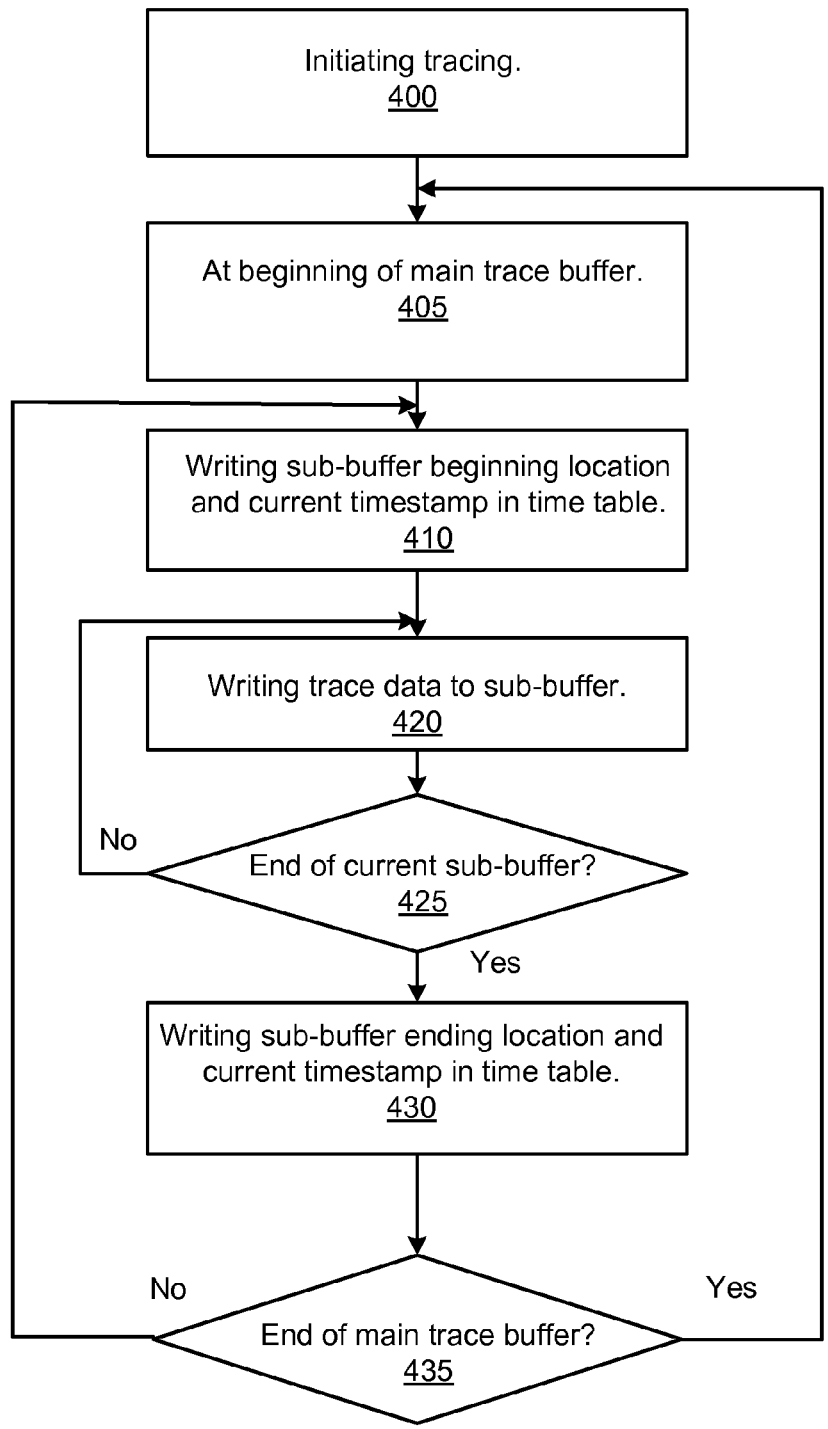
FIG. 4 is an operational flowchart illustrating an algorithm for a performing an in-memory trace, according to various embodiments of the disclosure.

Referring now to FIG. 4, an algorithm for performing an in-memory trace is illustrated. While the algorithm is described in terms of one main trace buffer 200 (FIG. 2), it should be noted that the algorithm is practiced for each CPU 16 in the server 12 (both of FIG. 1) participating in the trace. At 400 an end-user having sufficient authority to perform the action, such as a systems administrator, initiates a trace. The manner of initiating a trace and the options available to the trace may be vendor and/or implementation dependent. For example, options may include: a main trace buffer size; a number of sub-buffers; a selection of CPUs to trace, or all CPUs; the events to trace; and a selection of processes or threads to trace.

At 405 at the beginning of the main trace buffer, the trace component receives from the OS 40 (FIG. 1) a location of the main trace buffer 200 (FIG. 2) for each CPU 16 in the server 12 (both of FIG. 1) participating in the trace, and an address in memory for the per-CPU table 300 (FIG. 3). As described previously with reference to FIG. 2, the number of sub-buffers 205 (FIG. 2) per CPU may be calculated, based on the requested main trace buffer size, or may be user-configured. The begin address 325 (FIG. 3) of each sub-buffer 205 (FIG. 2) is also determined.

At 410, the first entry 305 in the per-CPU table 300 is initialized, including: the begin timestamp 315 (all of FIG. 3) of the first entry in the first sub-buffer 205 (FIG. 2); and the begin address 325 (FIG. 3) of the first sub-buffer 205 (FIG. 2). In another embodiment, all begin addresses 325 (FIG. 3) may be calculated and updated for each index 310 (FIG. 3) upon initialization of the per-CPU table 300 (FIG. 3).

At 420 the trace component writes events to the next position in the current sub-buffer 205 (FIG. 2), according to the trace options requested by the end-user.

At 425, if the trace component detects the end of the current sub-buffer 205 (FIG. 2), then at 430 the trace component records in the per-CPU table 300 (FIG. 3): the end timestamp 320 (FIG. 3) of the last event written to the current sub-buffer 205 (FIG. 2); and the end address 330 (FIG. 3) of the current sub-buffer 205 (FIG. 2). However, if at 425 the end of the current sub-buffer 205 (FIG. 2) is not reached, then at 420 the trace component continues writing events to the current sub-buffer 205 (FIG. 2).

At 435, if the trace component detects the end of the main trace buffer 200 (FIG. 2), processing continues to 405, since the main trace buffer 200 (FIG. 2) is circular. A circular trace buffer is one where the newest event entries overwrite the oldest ones when the end of the trace buffer is detected. However, if at 435 the end of the main trace buffer 200 (FIG. 2) is not detected, the trace component advances to the next sub-buffer 200 (FIG. 2) at 410.

It may be recognized that the present disclosure may be implemented for any in-memory circular trace mechanism, such as the network tracing facilities, iptrace and tcpdump, or hardware trace facilities, such as network sniffer or fibre-channel analyzers.

Figure 5:
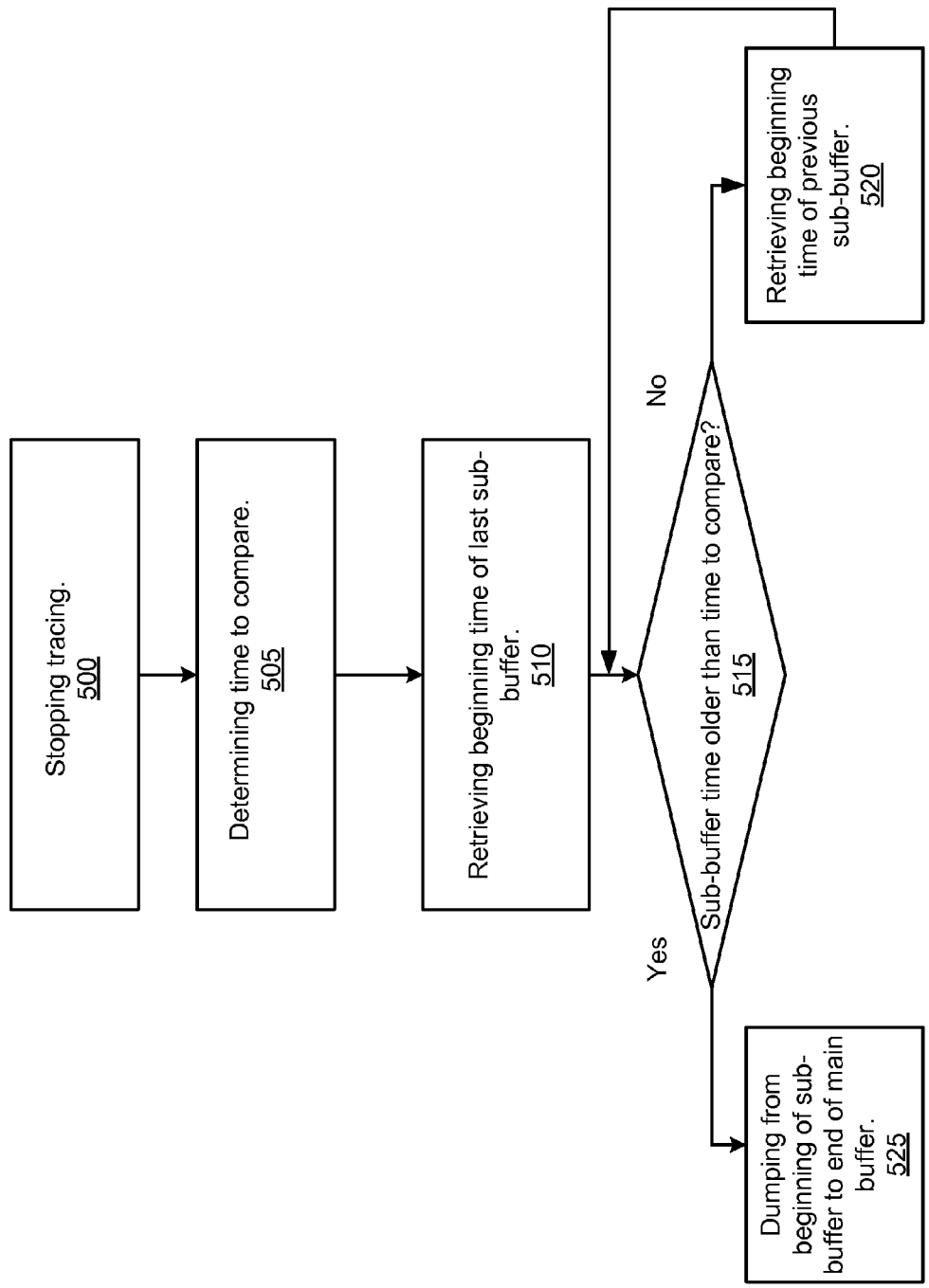
FIG. 5 is an operational flowchart illustrating an algorithm for a stopping an in-memory trace and filtering events, according to various embodiments of the disclosure.

Turning now to FIG. 5, an algorithm for stopping an in-memory trace and filtering events is illustrated. While the algorithm is described in terms of one main trace buffer 200 (FIG. 2), it should be noted that the algorithm is practiced for each CPU 16 in the server 12 (both of FIG. 1) participating in the trace. At 500, an end-user issues a command to stop the trace. The trace stop command may include a time parameter that may be used to filter the events in the trace buffers 200 (FIG. 2) to extract only the events that match the time criteria.

At 505 the trace component, or another component in the OS 40 (FIG. 1), determines a compare time to use to filter the extraction of events of a certain age from the in-memory trace. The age may be a relative displacement from current time, such as within the last three seconds, or absolute, such as since 3:15 today. As described previously with reference to FIG. 3, the system internal time of a server 12 (FIG. 1) may be measured in seconds relative to the EPOCH. The compare time parameter may be subtracted from the system internal time when the compare time parameter is expressed in seconds. However, a well-known library routine may be used to convert a compare time from an absolute value to a value that may be used to subtract from the system internal time. In another embodiment, the compare time may be a range expressed as a begin time and an end time.

At 510 the trace component retrieves the begin timestamp 315 (FIG. 3) of the last sub-buffer 205 in the main trace buffer 200 (both of FIG. 2). At 515, the begin time stamp 315 (FIG. 3) is compared to the calculated compare time. If the begin timestamp 315 (FIG. 3) of the last sub-buffer 205 (FIG. 2) is older than or equal to the calculated compare time, the desired range of events is within the last sub-buffer 205 (FIG. 2). Therefore, at 525 the trace events are extracted from the start of the last sub-buffer 205 to the end of the main trace buffer 200 (both of FIG. 2) and written to a storage system 34 or SAN 15 (both of FIG. 1). However, if the begin timestamp 315 (FIG. 3) of the last sub-buffer 205 (FIG. 2) is newer than that of the calculated compare time, the desired range of events is not within the last sub-buffer 205 (FIG. 2). Therefore, at 520 the begin timestamp 315 (FIG. 3) of the previous sub-buffer 205 (FIG. 2) is retrieved. The comparison continues at 515 until the desired events are located and subsequently extracted to a storage system 34 or SAN 15 (both of FIG. 1).

Figure 6:
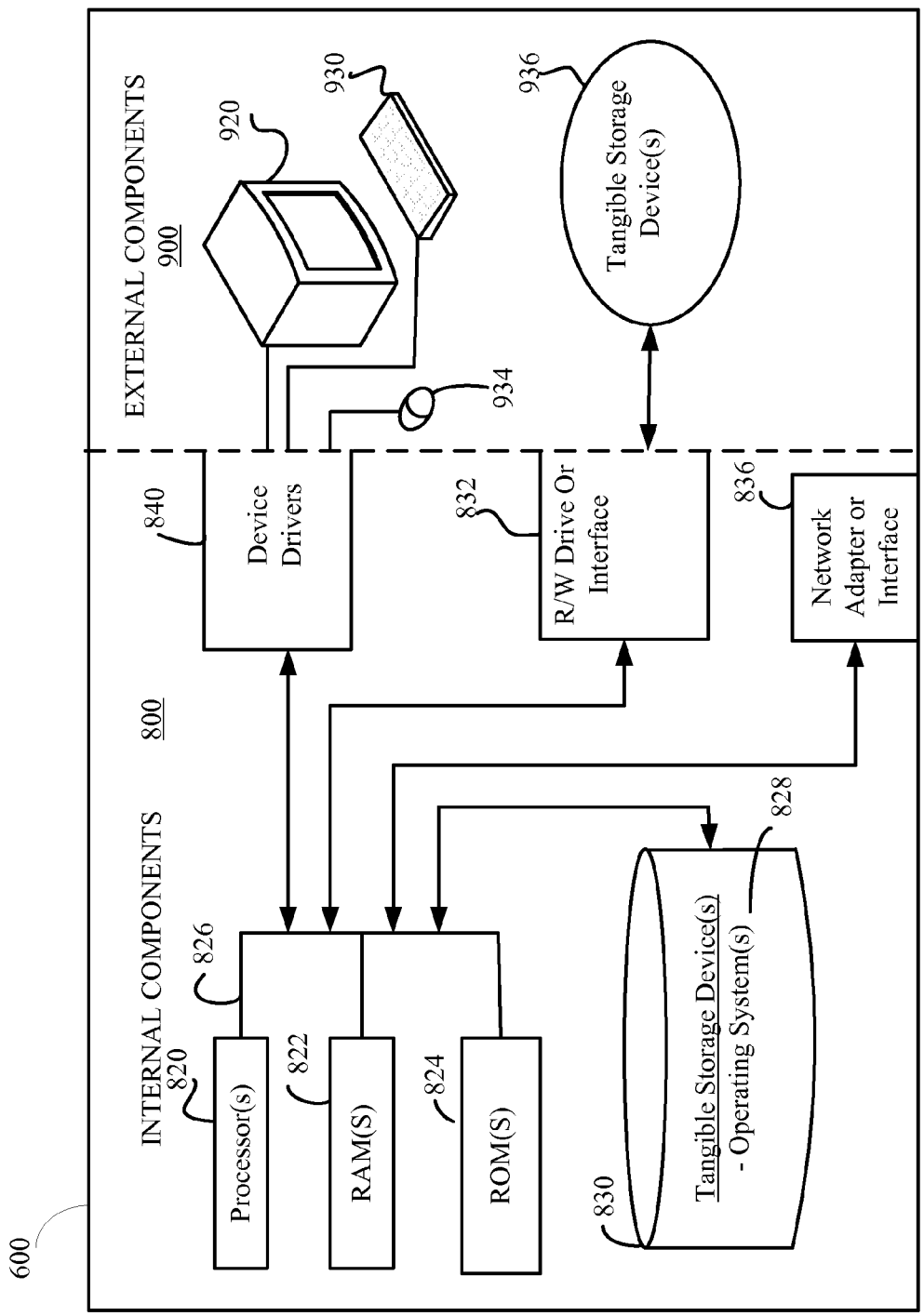
FIG. 6 is a schematic block diagram of hardware and software of the computer environment according to an embodiment of the processes of FIGS. 4-5.

Referring now to FIG. 6, computing device 600 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the method of FIGS. 4-5; and one or more computer-readable tangible storage devices 830. The one or more operating systems 828 are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 600, can be downloaded to computing device 600 from an external computer (e.g., server) via a network (for example, the Internet, a local area network, or other wide area network) and respective network adapters or interfaces 836. From the network adapters (or switch port adapters) or interfaces 836 and operating system 828 associated with computing device 600 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for filtering multiple in-memory trace buffers for event ranges comprising:
   allocating a plurality of main trace buffers, based on a number of central processing units (CPU) participating in a trace, wherein each CPU has a dedicated main trace buffer, and wherein each main trace buffer is circular;
   dividing each of the plurality of main trace buffers into an equal number of sub-buffers;
   writing a plurality of events to one or more sub-buffers of said main trace buffer;
   determining a compare time as a filter to extract events of a certain age; and
   obtaining a begin time stamp corresponding to a first event written to a last sub-buffer of said one or more sub-buffers;
   determining whether said begin time stamp of said last sub-buffer is older than said compare time, and if said begin time stamp of last sub-buffer is older than said current compare time,
   extracting the plurality of events from said last sub-buffer to an end of said main trace buffer; and otherwise, if said begin time stamp of said last sub-buffer is not older than said current compare time, iteratively traversing each sub-buffer prior to said last sub-buffer, in succession, to determine, at each iteration, whether a respective begin time stamp of a prior sub-buffer is older than the determined compare time; and extracting the plurality of events from at least said prior sub-buffer, said extracting starting with the prior sub-buffer of said one or more sub-buffers having said begin time stamp that is older than the determined compare time and through the end of the last sub-buffer.

2. The method of claim 1, wherein each of the plurality of main trace buffers has a corresponding time table, and wherein the time table comprises:
an index corresponding to the sub-buffer number;
an end timestamp, wherein the end timestamp corresponds to a last event written to the sub-buffer;
a begin address, wherein the begin address is a starting memory location of the sub-buffer; and
an end address, wherein the end address is an ending memory location of the sub-buffer.

3. The method of claim 1, wherein:
a size of the main trace buffer is user-configurable.

4. The method of claim 1, wherein the compare time includes: a relative displacement from current time; and
an absolute time.

5. The method of claim 1, wherein each of the plurality of sub-buffers is contiguously located in the main trace buffer.

6. The method of claim 1, wherein each of the plurality of the sub-buffers includes a pointer to a location in memory of a next sub-buffer.

7. A computer program product for filtering multiple in-memory trace buffers for event ranges comprising a non-transitory computer readable storage medium readable by a processing circuit and storing instructions for execution by the processing circuit for performing a method comprising:
allocating a plurality of main trace buffers, based on a number of central processing units (CPU) participating in a trace, wherein each CPU has a dedicated main trace buffer, and wherein each main trace buffer is circular;
dividing each of the plurality of main trace buffers into an equal number of sub-buffers;
writing a plurality of events to one or more sub-buffers of said main trace buffer;
determining a compare time as a filter to extract events of a certain age;
obtaining a begin time stamp corresponding to a first event written to a last sub-buffer of said one or more sub-buffers;
determining whether said begin time stamp of said last sub-buffer is older than said compare time, and if said begin time stamp of last sub-buffer is older than said current compare time,
extracting the plurality of events from said last sub-buffer to an end of said main trace buffer; and
otherwise, if said begin time stamp of said last sub-buffer is not older than said current compare time, iteratively traversing each sub-buffer prior to said last sub-buffer, in succession, to determine, at each iteration, whether a respective begin time stamp of a prior sub-buffer is older than the determined compare time; and
extracting the plurality of events from at least said prior sub-buffer, starting with the prior sub-buffer of said one or more sub-buffers having said begin time stamp that is determined older than the determined compare time and through the end of the last sub-buffer.

8. The computer program product of claim 7, wherein each of the plurality of main trace buffers has a corresponding time table, and wherein the time table comprises:
an index corresponding to the sub-buffer number;
an end timestamp, wherein the end timestamp corresponds to a last event written to the sub-buffer;
a begin address, wherein the begin address is a starting memory location of the sub-buffer; and
an end address, wherein the end address is an ending memory location of the end of the sub-buffer.

9. The computer program product of claim 7, wherein: a size of the main trace buffer is user-configurable.

10. The computer program product of claim 7, wherein the compare time includes:
a relative displacement from current time; and
an absolute time.

11. The computer program product of claim 7, wherein each of the plurality of sub-buffers is contiguously located in the main trace buffer.

12. A computer system for filtering multiple in-memory trace buffers for event ranges comprising a memory, a processing unit communicatively coupled to the memory, wherein the processing unit is configured to perform the steps of a method comprising:
allocating a plurality of main trace buffers, based on a number of central processing units (CPU) participating in a trace, wherein each CPU has a dedicated main trace buffer, and wherein each main trace buffer is circular;
dividing each of the plurality of main trace buffers into an equal number of sub-buffers;
writing a plurality of events to one or more sub-buffers of said main trace buffer;
determining a compare time as a filter to extract events of a certain age;
obtaining a begin time stamp corresponding to a first event written to a last sub-buffer of said one or more sub-buffers;
determining whether said begin time stamp of said last sub-buffer is older than said compare time, and if said begin time stamp of last sub-buffer is older than said current compare time,
extracting the plurality of events from said last sub-buffer to an end of said main trace buffer; and
otherwise, if said begin time stamp of said last sub-buffer is not older than said current compare time, iteratively traversing each sub-buffer prior to said last sub-buffer, in succession, to determine, at each iteration, whether a respective begin time stamp of a prior sub-buffer is older than the determined compare time; and
extracting the plurality of events from at least said prior sub-buffer, starting with the prior sub-buffer of said one or more sub-buffers having said begin time stamp that is older than the determined compare time and through the end of the last sub-buffer.

13. The computer system of claim 12, wherein each of the plurality of main trace buffers has a corresponding time table, and wherein the time table comprises:
an index corresponding to the sub-buffer number;
an end timestamp, wherein the end timestamp corresponds to a last event written to the sub-buffer;
a begin address, wherein the begin address is a starting memory location of the sub-buffer; and
an end address, wherein the end address is an ending location in memory of the sub-buffer.

14. The computer system of claim 12, wherein a size of the main trace buffer is user-configurable.

15. The computer system of claim 12, wherein the compare time includes: a relative displacement from current time; and
an absolute time.

16. The computer system of claim 12, wherein each of the plurality of sub-buffers is contiguously located in the main trace buffer.

17. The computer system of claim 12, wherein each of the plurality of the sub-buffers includes a pointer to the location in memory of the next sub-buffer.

* * * * *